United States Patent
Carney, Jr. et al.

[15] 3,659,752
[45] May 2, 1972

[54] EASILY REMOVABLE FLUID PERMEABLE STRUCTURE FOR AERATED HOPPER DISCHARGE OUTLETS

[72] Inventors: John L. Carney, Jr., St. Louis County; Dennis J. Schipper, St. Charles, both of Mo.

[73] Assignee: ADF Industries, Incorporated, New York, N.Y.

[22] Filed: Mar. 19, 1970

[21] Appl. No.: 21,127

[52] U.S. Cl. ........................ 222/195, 222/505, 302/53
[51] Int. Cl. .................................................. B65g 3/12
[58] Field of Search .......... 222/195, 505; 302/53; 105/283; 251/305; 214/83.28

[56] References Cited

UNITED STATES PATENTS

| | | | |
|---|---|---|---|
| 3,099,498 | 7/1963 | Jahn | 302/53 |
| 3,448,900 | 6/1969 | Jakobsson et al. | 222/195 |
| 3,253,750 | 5/1966 | Paton | 222/195 |
| 3,246,805 | 4/1966 | Kemp | 222/195 |

*Primary Examiner*—Robert B. Reeves
*Assistant Examiner*—Francis J. Bartuska
*Attorney*—Eugene N. Riddle

[57] ABSTRACT

A fluid permeable member for an aerated hopper discharge outlet which may be easily inserted within and removed from the hopper discharge outlet. The fluid permeable member comprises a one-piece inner insert having a central discharge opening in vertical alignment with the discharge opening of the bottom discharge outlet and is easily secured in spaced relation to the outer lower housing or body of the discharge outlet by releasable securing means, such as threaded bolts. The inner fluid permeable insert is preferably formed of a stainless steel wire mesh material. The outer housing of the discharge outlet has an upper peripheral flange mating with a lower peripheral flange on the bottom of the hopper, and the fluid permeable member has a peripheral flange positioned and gripped between the mating flanges of the outer housing and the superjacent hopper.

4 Claims, 5 Drawing Figures

Patented May 2, 1972

INVENTORS.
JOHN L. CARNEY, JR.
DENNIS J. SCHIPPER
BY Eugene N. Riddle

ATTORNEY

Patented May 2, 1972

EASILY REMOVABLE FLUID PERMEABLE STRUCTURE FOR AERATED HOPPER DISCHARGE OUTLETS

BACKGROUND OF THE INVENTION

Fluidized hopper discharge outlet structures have been employed heretofore beneath hoppers for the unloading of finely divided or pulverulent materials. Fluid permeable members have normally been secured within the outlet structure to form a plenum chamber between the outer body of the outlet structure and the fluid permeable structure for fluidizing material being unloaded. However, such fluid permeable members have been difficult to remove from the discharge outlet for repair or replacement. At times, the pores or interstices of the fluid permeable member become clogged with finely divided lading, such as cement or flour, and the fluid permeable member requires cleaning. Further, periodic inspection of the fluid permeable member is required to determine if damage has been incurred or if the member requires cleaning.

DESCRIPTION OF THE INVENTION

The fluidized bottom outlet structure comprising the present invention includes a fluid permeable member which is particularly adapted to be easily removed from the outer housing such as might be necessary or desirable for repair, replacement, inspection, or cleaning. The fluid permeable member has an inner mounting pad or ring defining a center discharge opening in vertical alignment with the bottom discharge opening of the hopper outlet defined by a mating flange. Suitable removable studs secure the inner mating flanges together. A mounting flange extends about the outer periphery of the hopper outlet structure, and the fluid permeable member has a mating outer peripheral flange adapted to be secured between the outer flange on the hopper outlet structure and a mating peripheral mounting flange on the hopper. Support ribs are provided in the plenum chamber to provide intermediate supports for the fluid permeable member. The fluid permeable member is preferably formed of a one-piece stainless steel wire mesh or porous metal.

The invention accordingly comprises the constructions hereinafter described, the scope of the invention being indicated in the following claims.

In the accompanying drawings, in which one of various possible embodiments of the invention is illustrated, FIG. 1 is a partial side elevation of a covered hopper railway car having a bottom outlet structure comprising the present invention thereon;

Figure 1:
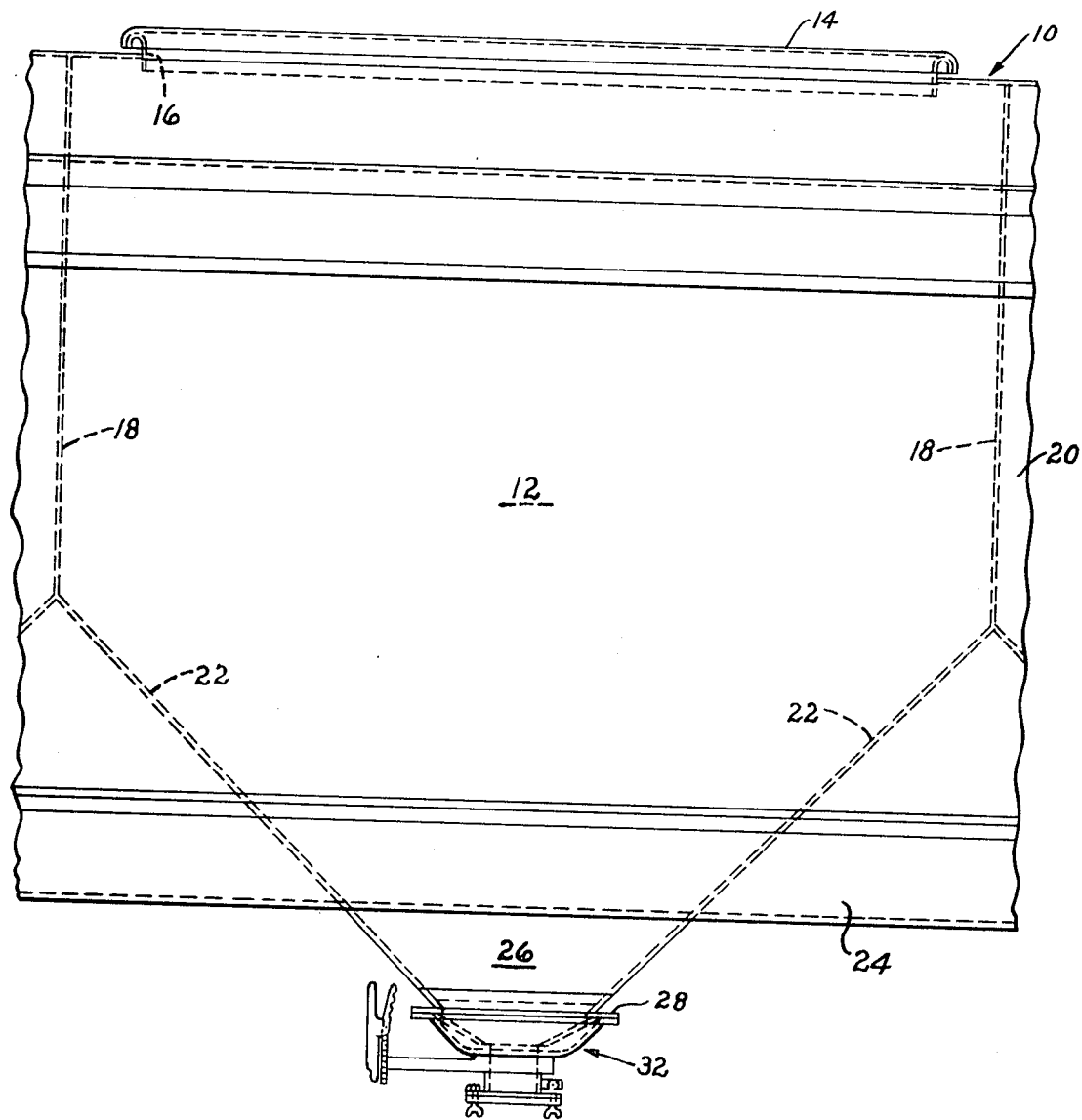

Referring now to the drawings for a better understanding of the invention, a railway hopper car partially shown at 10 has a hopper 12 with a hatch cover 14 thereon. A hatch opening 16 permits the loading of hopper 12 upon opening of hatch cover 14. Bulkheads 18 are secured between hopper side sheets 20 and hopper slope sheets 22 lead downwardly from bulkheads 18. A side sill 24 extends along the lower marginal portion of each hopper side sheet 20 and slope sheets 26 extend downwardly from side sills 24. Hopper slope sheets 22 and 26 terminate at a peripheral lower mounting flange 28 which defines a bottom hopper opening 30.

Figure 2:
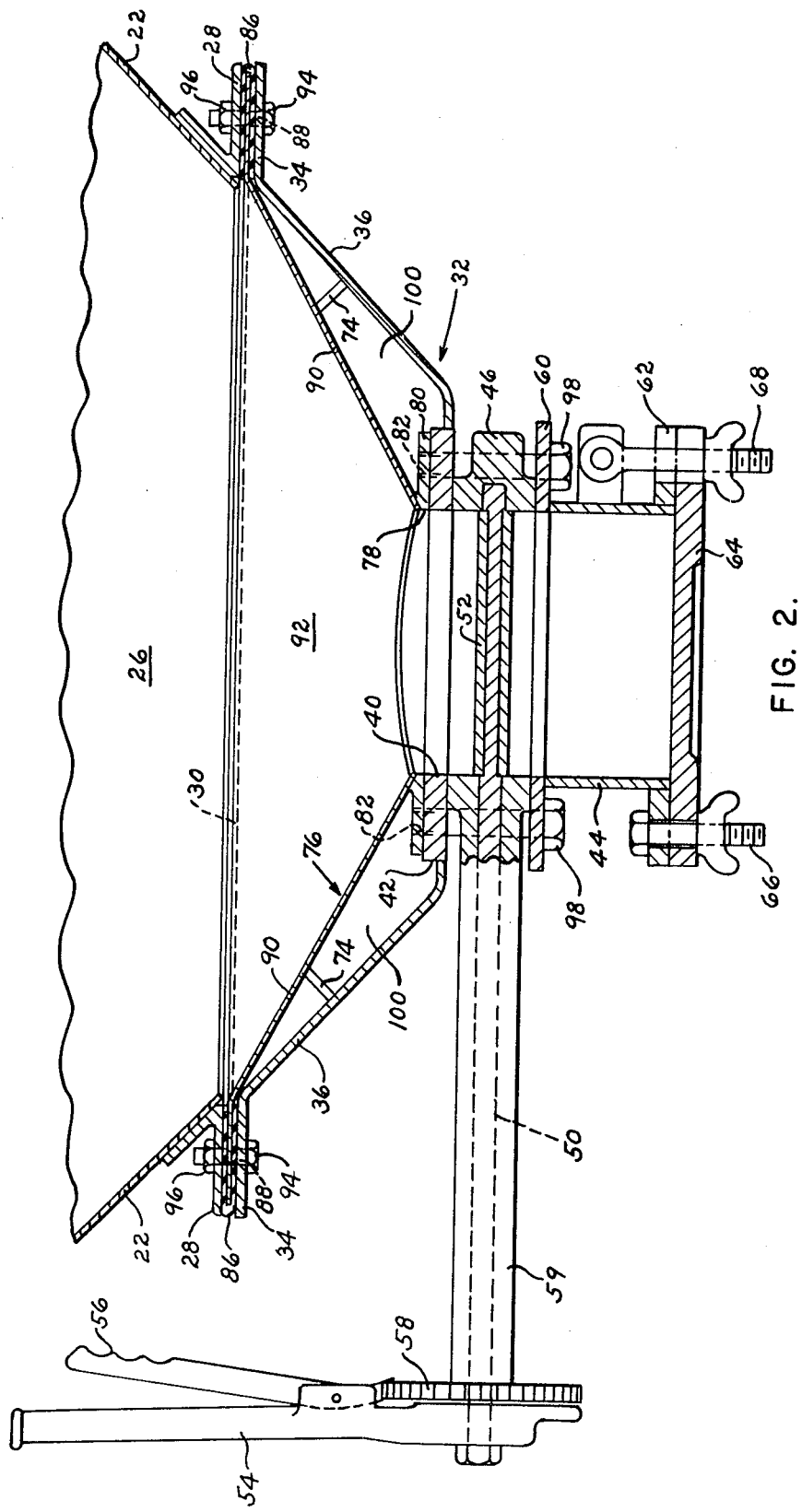
FIG. 2 is an enlarged side elevation of the bottom outlet structure illustrated in FIG. 1.
Figure 3:
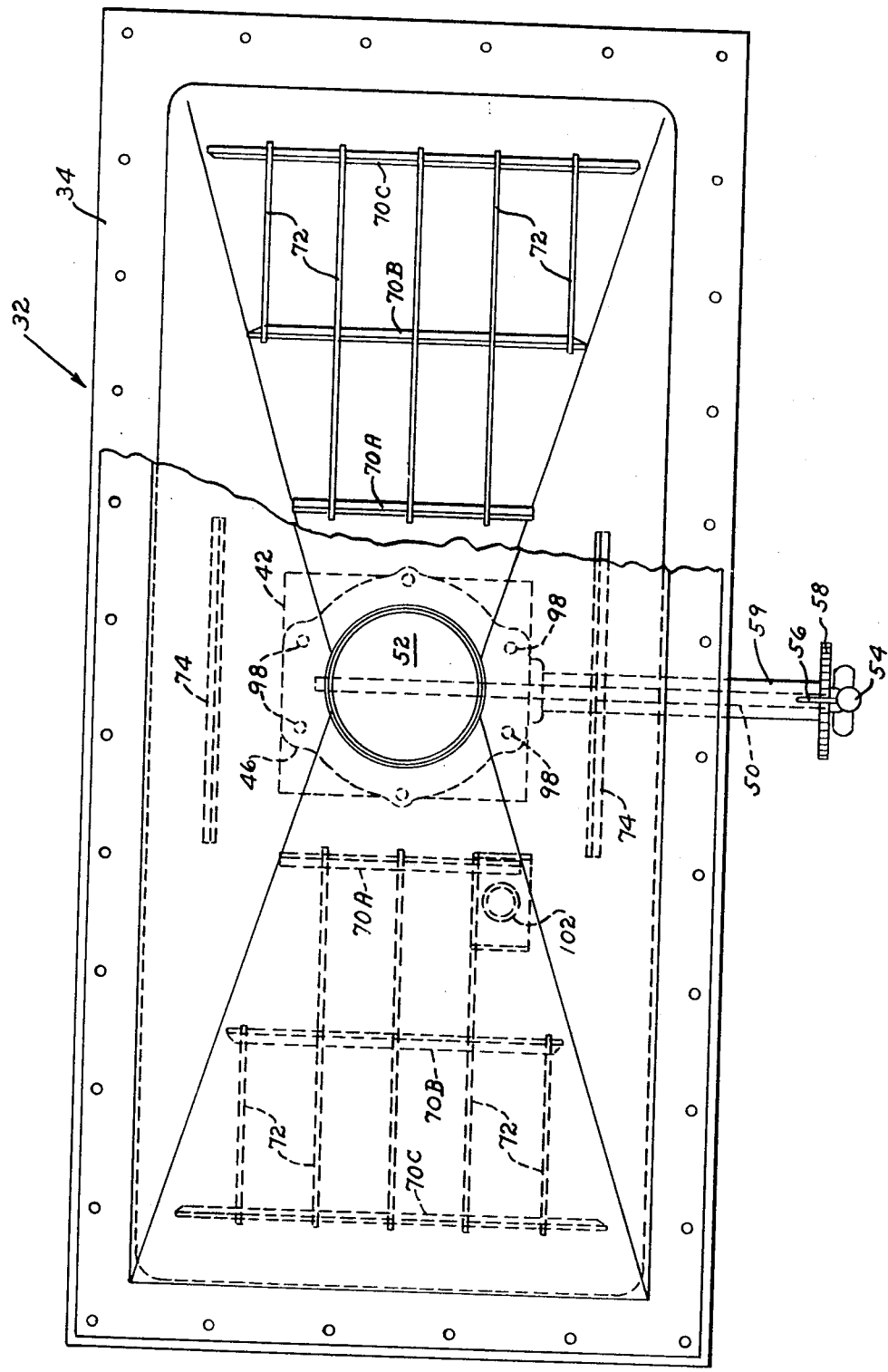
FIG. 3 is a top plan of the bottom outlet structure removed from the hopper with a portion of the fluid permeable member broken away.

A bottom outlet discharge structure is generally indicated 32 and has an upper peripheral flange 34 which mates with the hopper flange 28 as clearly shown in FIG. 2. Outer housing of discharge structure 32 includes outlet slope sheets 36 and 38 which slope downwardly from flange 34 to a bottom discharge opening 40 defined by a circular mounting ring or pad 42. A tubular discharge outlet 44 beneath ring 42 has a bearing ring 46 thereon supporting a shaft 50 for rotation. A butterfly valve 52 is secured to shaft 50 and a handle 54 on the outer end of shaft 50 may be actuated to open and close valve 52. A spring mounted arm 56 may be gripped to remove a lower detent from a notched wheel 58 on sleeve 59 secured to bearing ring 46. A flange 60 extends beneath bearing ring 46 and a lower flange 62 extends about the lower end of tubular discharge outlet 44 as shown particularly in FIGS. 2 and 4. A lower cover 64 for outlet 44 is mounted for pivotal movement to an open position about a pin 66 on flange 62. Cover 64 is secured in position by a swing bolt 68 which is received within a suitable slot in flange 62.

Figure 4:
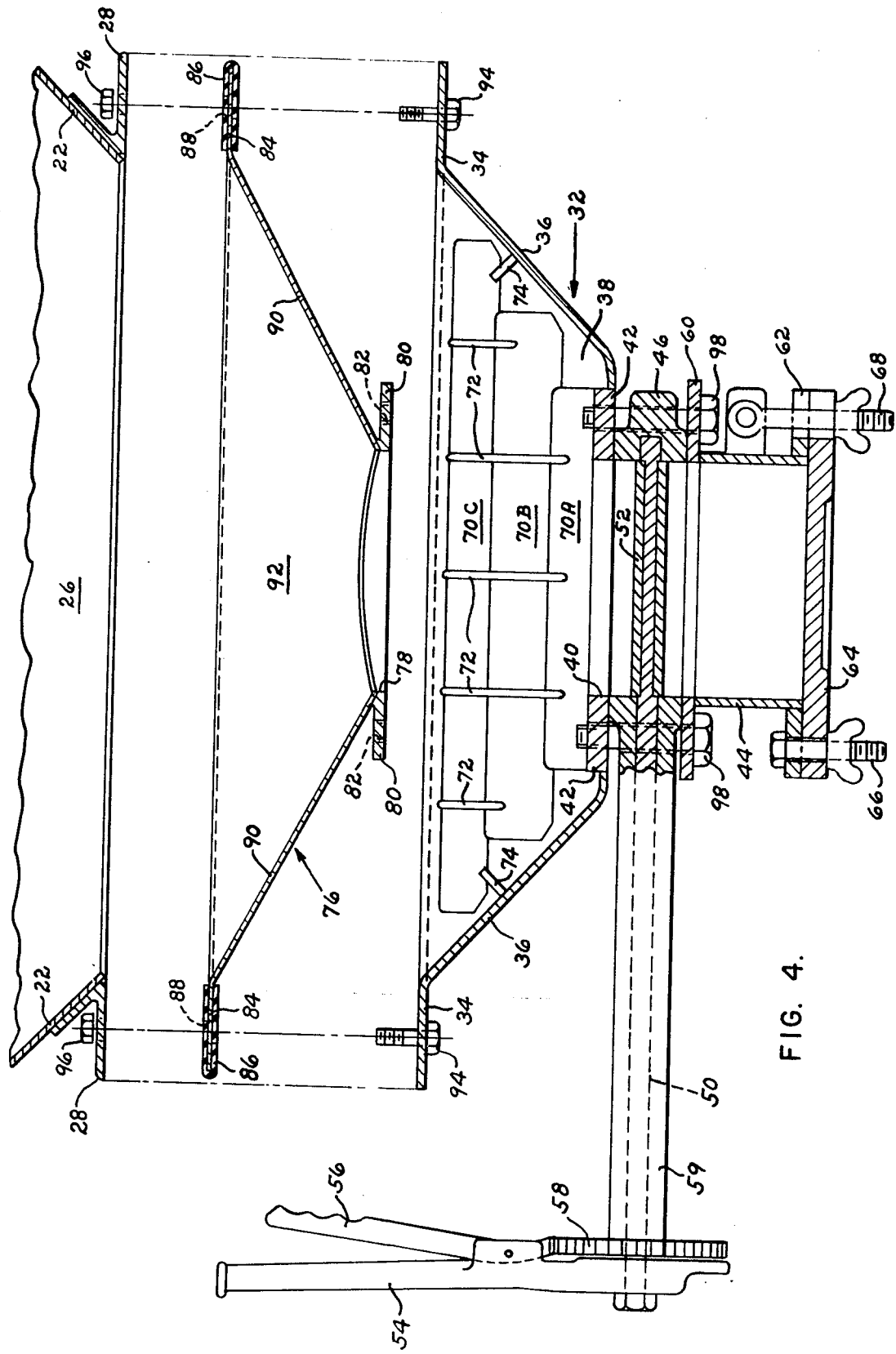
FIG. 4 is an exploded transverse section of the bottom outlet structure shown in FIG. 3 with the inner fluid permeable member shown before insertion within the bottom outlet structure.

Secured to the inner surface of slope sheets 38 are generally parallel support ribs 70A, 70B, and 70C, connected by transverse ribs 72. Slope sheets 36 have support ribs 74 thereon. A fluid permeable member generally indicated 76 has a central opening 78 therein defined by a circular mounting pad 80 having threaded openings 82 therein. Permeable member 76 has an upper peripheral flange 84 with a generally U-shaped resilient gasket 86 extending thereover. Suitable openings 88 are provided as shown in FIG. 4 in flange 84 and gasket 86. Sides 90 and 92 slope downwardly from flange 84 to the center discharge opening 78. Suitable openings are provided in mating flanges 28 and 34 aligned with openings 88. Studs or bolts 94 fit within openings 88 and nuts 96 draw flanges 28 and 34 together to grip flange 84 and gasket 86 tightly therebetween.

Figure 5:
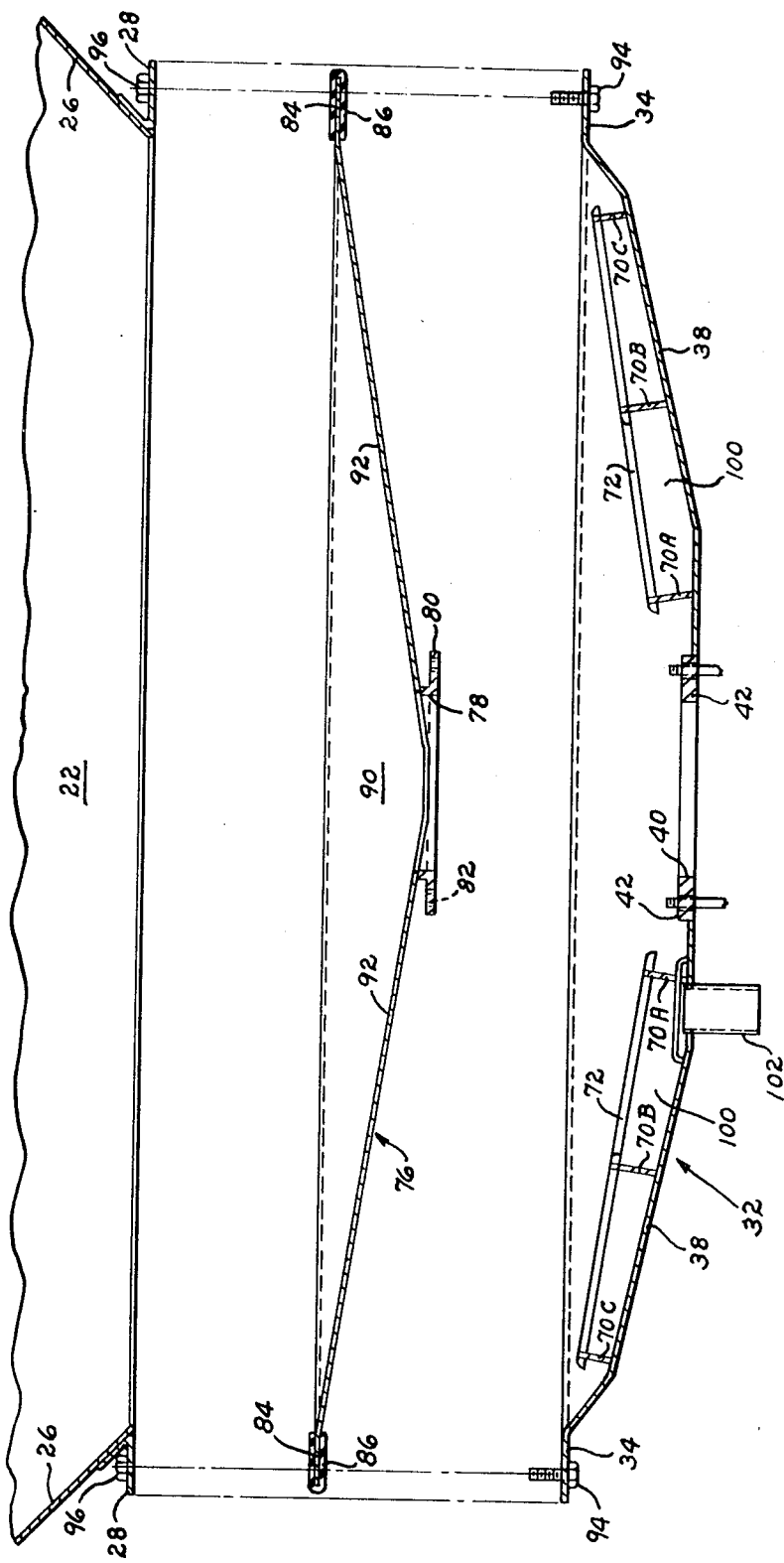
FIG. 5 is an exploded longitudinal section of the bottom outlet structure shown in FIG. 3 with the inner fluid permeable member shown before insertion within the bottom outlet structure.

To assemble bottom outlet structure 32, fluid permeable member 76 is inserted within the body or housing formed by outlet slope sheets 36 and 38 and is supported on ribs 70A, 70B, 70C, 72 and 74 with circular ring 80 mating and fitting on mounting pad 42. Threaded openings 82 in ring 80 are vertically aligned with openings in mounting pad 42, flange 60, and bearing ring 46. In this position, studs or bolts 98 may be threaded within openings 82 and drawn tight thereby to secure fluid permeable member 76 in position. Then bolts 94 may be inserted within openings 88 and aligned openings in flanges 28 and 34, and then drawn tight by nuts 96 to provide a fluid tight connection between flanges 28 and 34. A plenum chamber 100 is formed between the outer housing of bottom outlet structure 32 and fluid permeable member 76. Air is supplied to plenum chamber 100 by a suitable air inlet 102 as shown particularly in FIG. 5.

To discharge lading from hopper 12, cover 64 is first opened by release of swing bolt 68 and pivoting of cover 64 about pivot 66 to an open position. Air is supplied from a suitable source to air inlet 102 and plenum chamber 100. Air permeates fluid permeable member 76 to fluidize the lading resting above fluid permeable member 76. Then, butterfly valve 52 may be rotated to an open position upon release of arm 56 and movement of handle 54.

Fluid permeable member 76 may be formed from a plurality of stainless steel wire mesh layers bonded to each other at contact points by sintering and then calendering. As a specific example, three stainless steel wire mesh layers may be bonded together for a thickness of 0.052 inch with a permeability of between six to 13. A material which has been found to be satisfactory for fluid permeable member is sold under the trademark "Dynapore" by Michigan Dynamics Division of Ambac Industries, Inc., 1565 Oakman Blvd., Detroit, Mich.

In the event it is desired to remove fluid permeable member 76 for inspection, cleaning, repair, or replacement, it is only necessary to remove nuts 96 from studs 94 and then remove studs 98. Permeable member 76 may then be lifted from the housing of bottom outlet structure 32 for assembly or repair.

We claim:

1. A bottom outlet structure adapted to be secured to a mounting flange beneath a hopper and comprising, a housing having an upper peripheral mounting flange extending thereabout and funneling downwardly from the upper peripheral flange to a bottom discharge opening, an inner mounting ring on the housing defining said bottom discharge opening, a butterfly valve structure beneath the mounting ring to control the flow of lading from the bottom discharge opening and including a bearing ring in general vertical alignment with the mounting ring, an easily removable fluid permeable member fitting within the outlet structure and having an inner ring-shaped mounting pad defining a central opening in vertical alignment with said bottom discharge opening, the mounting pad of the fluid permeable member supported on and in face-to-face contact with said mounting ring, support ribs between the fluid permeable member and said housing to support the fluid permeable member thereon, a plenum chamber beneath the fluid permeable member, studs extending through said bearing and mounting rings and said mounting pad for connecting the mounting pad and rings, an upper peripheral flange on said fluid permeable member positioned between the mounting flange on the housing and the mounting flange beneath the hopper, and studs extending through said mounting flanges and said upper peripheral flange for clamping in a secured position the peripheral flange of the fluid permeable member between said mounting flanges.

2. A bottom outlet structure adapted to be secured to a mounting flange beneath a hopper and comprising; a housing having an upper peripheral mounting flange extending thereabout and funneling downwardly from the upper peripheral flange to a bottom discharge opening, an inner mounting ring on the housing defining said bottom discharge opening; a discharge structure beneath the mounting ring to control the flow of lading from the bottom discharge opening and including a mounting flange in general vertical alignment with the mounting ring; an easily removable fluid permeable member fitting within the outlet structure and having an inner mounting pad defining a central opening in vertical alignment with said bottom discharge opening, the mounting pad of the fluid permeable member supported on and in face-to-face contact with said mounting ring, support ribs between the fluid permeable member and said housing to support the fluid permeable member thereon, a plenum chamber beneath the fluid permeable member; studs connecting the mounting flange of the discharge structure, the inner mounting ring of the housing, and the mounting pad of the permeable member; an upper peripheral flange on said fluid permeable member positioned between the mounting flange on the housing and the mounting flange beneath the hopper; and studs connecting the housing mounting flange, the mounting flange beneath the hopper, and the upper peripheral flange of the permeable member for clamping in a secured position said peripheral flange of the permeable member between the respective mounting flanges.

3. A bottom outlet structure as set forth in claim 2 wherein a generally U-shaped resilient gasket fits about both faces of said peripheral flange of the permeable member between said mounting flanges.

4. A bottom outlet structure as set forth in claim 2 wherein said fluid permeable member comprises a one-piece stainless steel mesh material having a thickness less than around 0.15 inch.

* * * * *

Case 275

PO-1050
(5/69)

UNITED STATES PATENT OFFICE
CERTIFICATE OF CORRECTION

Patent No. 3,659,752     Dated May 2, 1972

Inventor(s) John L. Carney, Jr., Dennis J. Schipper

It is certified that error appears in the above-identified patent and that said Letters Patent are hereby corrected as shown below:

"Assignee" should read -- ACF Industries, Incorporated --.

Signed and sealed this 3rd day of April 1973.

(SEAL)
Attest:

EDWARD M. FLETCHER, JR.
Attesting Officer

ROBERT GOTTSCHALK
Commissioner of Patents